H. CROOKS.
Running-Gears of Vehicles.

No. 148,039. Patented March 3, 1874.

Witnesses
George Zangere
Alexander Peur

Inventor
Henry Crooks

UNITED STATES PATENT OFFICE.

HENRY CROOKS, OF TIFFIN, OHIO, ASSIGNOR OF ONE-HALF HIS RIGHT TO HENRY K. HOFFMAN, OF SAME PLACE.

IMPROVEMENT IN RUNNING-GEARS OF VEHICLES.

Specification forming part of Letters Patent No. 148,039, dated March 3, 1874; application filed September 26, 1873.

*To all whom it may concern:*

Be it known that I, HENRY CROOKS, of the city of Tiffin, in the county of Seneca and State of Ohio, have invented a new and Improved Form of Running-Gear for Carriages and other Vehicles; and I do hereby declare that the following is a full, clear, and exact description thereof, reference being had to the accompanying drawings, making a part of this specification, in which—

Figure 1:
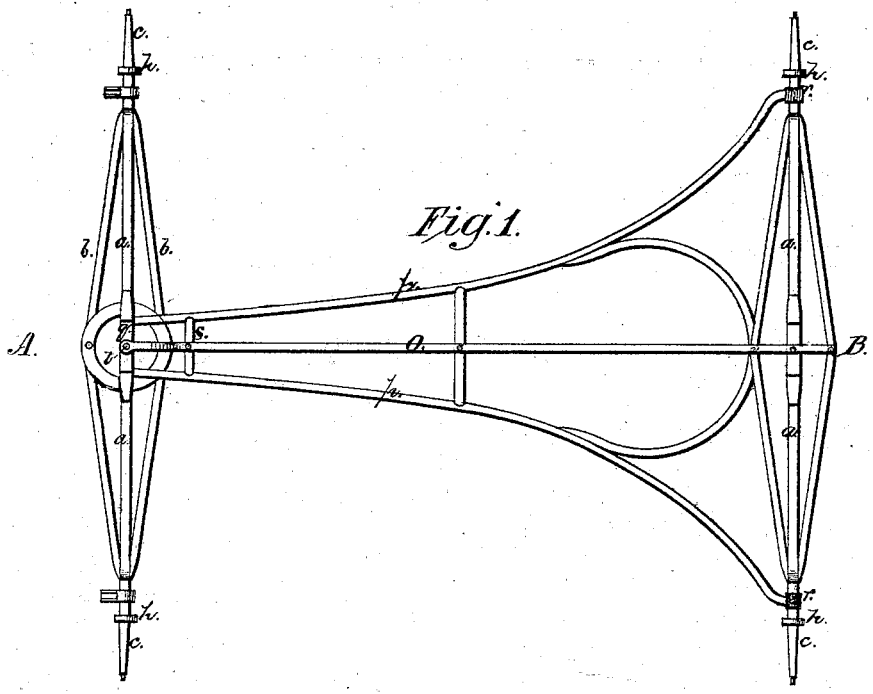
Figure 2:
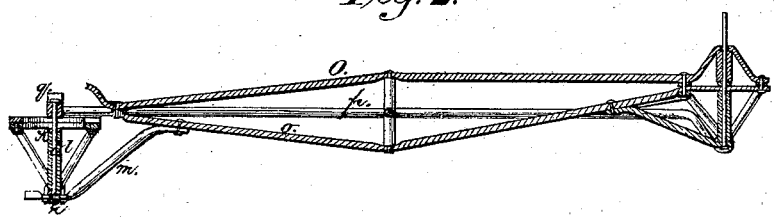
Figure 3:
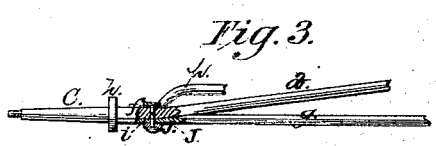

Figure 1 is a plan view of all its parts, and Fig. 2 is a vertical section on the line A B.

My invention relates to that class of running-gear which is made exclusively of iron, although my form of support, either triple, double, or single, may be used in connection with the ordinary form of axle and reach, as well as with that form hereinafter described and claimed. The object herein attained is great strength to sustain weight vertically, combined with lightness, and a form that takes all strain from the axle-tree between the wheels vertically, and the vibration horizontally.

The manner of constructing the same is as follows: For a one-inch axle-tree, I make the center bridge-piece $a$ of nine-sixteenths square or round iron, and the outside bridge-pieces of seven-sixteenths round iron. Those are bent in the form shown, and welded together at the ends, and onto the end thus formed I weld the short-arm axle $c$. I then form two plates of iron, one inch by four and three-eighths thick, $j$, into which I punch a hole and weld a pin, $i$, as seen at $f$ in Fig. 1, and I make a corresponding hole in the under side of the short axle C, into which the pin $i$ is fitted. The two plates last mentioned are then welded to a rod of seven-sixteenths iron, of suitable length, $g$, so as to fill the space between the collars $h$ $h$. Over the short axle $c$ and the plate $j$ is the clip which forms part of the draw-bar shackle $k$, which passes through suitable holes in the said shackle, which is made in the usual manner, and secured by nuts underneath, and by this means the pin $i$ is held in the recess made in the under side of the axle, whereby any downward spring, and the consequent elongation of the axle are fully provided for, and affords a ready means of detaching the same for repairs. The under half of the fifth-wheel is bolted or riveted onto all three of the bridge-pieces $a$ and $b$ $b$, and the upper half to the head-block $q$. Through the bar $g$, at the center, a hole is punched for the king-bolt $l$ to pass through, onto the lower end of which the safety-hook $m$ is placed and secured by the nut $n$. The other end of safety-hook $m$ is secured in like manner to the lower bar O of the reach or coupling. It will be seen that the reach is formed of two bars of nine-sixteenths round iron O O, which are secured in the center to the stay-bars $p$ $p$, by a cross made of the same size iron, the vertical ends of which are reduced, and pass through the bars O O, and are secured by nuts, and the lateral ends of which may be secured in like manner, but I prefer to turn two lugs on the ends, and secure them to the stay-bars $p$ $p$ with bolts, for convenience in detaching the same. The two front ends of the bars $p$ $p$ are welded onto the head-block $q$, and the rear ends are secured by the clip $r$, which also secures the bar $g$ to the axle, as already described. The rear axle is made in like manner as the front, with the exception of the fifth-wheel, and the top bar O of the reach passes over the lower side of the spring on the head-blocks $q$ $q$, being flattened at each end for the purpose of punching the necessary holes. There is also a cross-piece, $s$, in the rear of the front head-block, between the stay-bars $p$ $p$, at which the lower bar O of the reach terminates, and, together with the upper bar O, is secured by a bolt passing through the same. The king-bolt $l$, and the corresponding bolt in the rear axle, are made with a spindle at each end, the lower one passing through the bar $g$ and the brace below it, and the upper one passing through the lower bar O, bar $a$, head-block $q$, the spring, and the upper bar O, all of which are fastened by a nut on the top end of said bolt. The head-block $q$ on the rear axle may be dispensed with, if desired, and, in order to prevent any loosening of the nuts that hold the spring in place by jarring, I place a strip of thick leather between the spring and the head-block.

Having thus described the nature and construction of my invention, what I claim, and wish to secure by Letters Patent, is—

1. The bridge-bars $a\ b\ b$, combined and applied to a vehicle-axle, substantially as and for the purpose set forth.

2. The bridge-bars $a\ b\ b$, and the sustaining-bar $g$, combined and applied to vehicle-axle spindles, substantially as and for the purpose set forth.

3. The bars O O, forming the middle portion of the reach, combined with the sustaining-pieces $p\ p$, substantially as and for the purpose set forth.

4. The stay-bars $p\ p$ welded to the head-block $q$, in combination with the reach and cross-support, constructed as described, and for the purpose set forth.

In testimony that I claim the foregoing I hereunto set my hand this 20th day of September, A. D. 1873.

HENRY CROOKS.

Witnesses:
  GEORGE GONGERE,
  ALEXANDER PEW.